US009069422B2

(12) United States Patent
Chang et al.

(10) Patent No.: US 9,069,422 B2
(45) Date of Patent: Jun. 30, 2015

(54) PROJECTED CAPACITIVE TOUCH DEVICE AND TOUCH CONTROL METHODS FOR PROJECTED CAPACITIVE PANEL THEREOF

(75) Inventors: Chih-Chia Chang, Hsinchu County (TW); Chen-Pang Kung, Taoyuan County (TW); Chang-An Ho, Keelung (TW); Heng-Yin Chen, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 348 days.

(21) Appl. No.: 13/413,628

(22) Filed: Mar. 6, 2012

(65) Prior Publication Data

US 2013/0147758 A1    Jun. 13, 2013

(30) Foreign Application Priority Data

Dec. 7, 2011    (TW) .............................. 100145081 A

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
CPC ....... G06F 3/0416; G06F 3/0488; G06F 3/05; G06F 3/044; G06F 3/041; G06F 3/016
USPC .................................................. 345/173–174
See application file for complete search history.

(56) References Cited

U.S. PATENT DOCUMENTS

| | | | | |
|---|---|---|---|---|
| 5,818,429 | A * | 10/1998 | Tanaka et al. ................. | 345/173 |
| 6,943,785 | B2 * | 9/2005 | Chou et al. ..................... | 345/204 |
| 7,084,860 | B1 * | 8/2006 | Jaeger et al. ................... | 345/173 |
| 7,609,178 | B2 | 10/2009 | Son et al. | |
| 7,924,144 | B2 | 4/2011 | Makinen et al. | |
| 7,982,588 | B2 * | 7/2011 | Makinen et al. ........... | 340/407.2 |
| 8,031,094 | B2 * | 10/2011 | Hotelling et al. ............. | 341/143 |
| 2003/0067449 | A1 * | 4/2003 | Yoshikawa et al. ........... | 345/173 |
| 2006/0090632 | A1 * | 5/2006 | Ludwig .......................... | 84/645 |

(Continued)

FOREIGN PATENT DOCUMENTS

| | | |
|---|---|---|
| CN | 101520703 | 9/2009 |
| TW | M363640 | 8/2009 |

(Continued)

OTHER PUBLICATIONS

"Office Action of Taiwan Counterpart Application", issued on Mar. 13, 2014, p. 1-p. 8.

(Continued)

*Primary Examiner* — Christopher E Leiby
(74) *Attorney, Agent, or Firm* — Jiang Chyun IP Office

(57) ABSTRACT

A projected capacitive touch device, a projected capacitive touch panel and touch control methods thereof are disclosed. The touching control method includes mixing a detecting signal and a feedback driving signal to generate a sending signal; transmitting the sending signal to at least one touch sensing unit of the projected capacitive touch panel, wherein an electrical field is generated on the touch sensing unit according to the feedback driving signal so that a feedback tactile sense according to the electrical field can be obtained by a user while touching the touch sensing unit.

13 Claims, 4 Drawing Sheets

(56) References Cited

U.S. PATENT DOCUMENTS

| | | | | |
|---|---|---|---|---|
| 2008/0157893 | A1* | 7/2008 | Krah | 331/177 R |
| 2010/0079263 | A1* | 4/2010 | Anabuki et al. | 340/407.1 |
| 2010/0127999 | A1* | 5/2010 | Kim et al. | 345/173 |
| 2010/0141407 | A1 | 6/2010 | Heubel et al. | |
| 2010/0328053 | A1* | 12/2010 | Yeh et al. | 340/407.2 |
| 2011/0074732 | A1* | 3/2011 | Reynolds | 345/174 |
| 2011/0084857 | A1* | 4/2011 | Marino et al. | 341/5 |
| 2011/0109568 | A1* | 5/2011 | Wu et al. | 345/173 |
| 2011/0134063 | A1* | 6/2011 | Norieda | 345/173 |
| 2011/0141052 | A1* | 6/2011 | Bernstein et al. | 345/174 |
| 2011/0169758 | A1* | 7/2011 | Aono | 345/173 |
| 2011/0187651 | A1* | 8/2011 | Whitlow et al. | 345/173 |
| 2011/0210941 | A1* | 9/2011 | Reynolds et al. | 345/174 |
| 2011/0215914 | A1* | 9/2011 | Edwards | 340/407.2 |
| 2011/0227872 | A1 | 9/2011 | Huska et al. | |
| 2012/0056838 | A1* | 3/2012 | Harris et al. | 345/173 |
| 2013/0033450 | A1* | 2/2013 | Coulson et al. | 345/174 |
| 2013/0093725 | A1* | 4/2013 | Reynolds | 345/174 |

FOREIGN PATENT DOCUMENTS

| | | |
|---|---|---|
| TW | M363641 | 8/2009 |
| TW | M375253 | 3/2010 |
| TW | M387304 | 8/2010 |
| TW | M393736 | 12/2010 |
| TW | M393737 | 12/2010 |
| TW | 201112080 | 4/2011 |
| TW | M410923 | 9/2011 |
| TW | 201218039 | 5/2012 |

OTHER PUBLICATIONS

Yamamoto et al., "Electrostatic Tactile Display with Thin Film Slider and Its Application to Taticle Telepresentation Systems," IEEE Transactions on Visualization and Computer Graphics, Mar./Apr. 2006, pp. 168-177, vol. 12, No. 2.

Kaczmarek et al., "Polarity Effect in Electrvibration for Tactile Display," IEEE Transactions on Biomedical Engineering, Oct. 2006, pp. 2047-2054, vol. 53, No. 10.

Forlines et al., "Evalutating Tactile Feedback and Direct vs. Indirect Stylus Input in Pointing and Crossing Selection Tasks," CHI 2008 Proceedings-Tactile and Haptic User Interfaces, Apr. 5-10, 2008, pp. 1563-1572.

Israr et al, "Frequency and amplitude discrimination along the kinestheic-cutaneous continuum in the presence of masking stimulia)," J. Acoust. Soc. Am., Nov. 2006, pp. 2789-2800, 120 (5).

Harrison et al, "Providing Dynamically Changeable Physical Buttons on a Visual Display," CHI 2009 ~ Clicking on Buttons, Apr. 6, 2009, pp. 299-308.

Brewster et al., "Tactile Feedback for Mobile Interactions," CHI 2007 Proceedings• Mobile Interaction, Apr. 28-May 3, 2007, pp. 159-162.

"Office Action of Taiwan Counterpart Application", issued on Sep. 26, 2014, p. 1-p. 3.

"Office Action of US Counterpart Application", issued on Jan. 29, 2015, p. 1-p. 6.

* cited by examiner

PROJECTED CAPACITIVE TOUCH DEVICE AND TOUCH CONTROL METHODS FOR PROJECTED CAPACITIVE PANEL THEREOF

CROSS-REFERENCE TO RELATED APPLICATION

This application claims the priority benefit of Taiwan application serial no. 100145081, filed on Dec. 7, 2011. The entirety of the above-mentioned patent application is hereby incorporated by reference herein and made a part of this specification.

BACKGROUND OF THE INVENTION

1. Field of the Invention

The disclosure generally relates to a projected capacitive touch device and touch control methods thereof, more particularly, relates to a projected capacitive touch device and touch control methods thereof for generating feedback tactile senses.

2. Description of Related Art

In the electronic products of the recent years, touch technologies are applied to improve the interactions between the electronic devices and the users. As using a touch panel, the user can transmit the control commands for an electronic device on its screen, and compared with conventional keypads, the touch panel can execute the control actions for the electronic devices easily and directly.

However, it lacks real tactile feedback responses for a user who controls the electronic device through the touch panel. It should be noted that the feedback tactile sense in the real behavior is defined as that the tactile actions can be perceived by one whose fingers touch the screen, but not visual changes only. In the conventional arts, the vibrating stimulations are often used as the tactile feedback responses on the touch screen, and for the mechanism of the tactile feedback responses such as vibrating stimulations, it is a mature technology and easy to be devised and fabricated, but the drawback is that it is not applicable in the touch screen of a flexible electronic device.

SUMMARY OF THE INVENTION

The disclosure proposes a touch control method of a projected capacitive touch panel having a touch sensing unit formed by a matrix composed of a plurality of X-electrodes and Y-electrodes distributed intersectingly. The method comprises: mixing a detecting signal and a feedback driving signal to generate a sending signal; and transmitting the sending signal to the touch sensing unit, wherein the feedback signal generates an electrical field on at least one of the X-electrodes and at least one of the Y-electrodes of the touch sensing unit so that a feedback tactile sense according to the electrical field can be obtained by a user while touching the touch sensing unit.

The disclosure further proposes a touch control method of a projected capacitive touch panel having a touch sensing unit formed by a matrix composed of a plurality of X-electrodes and Y-electrodes distributed intersectingly. The method comprises: generating a detecting signal; transmitting the detecting signal to at least one touch sensing unit of the projected capacitive touch panel; receiving a touch result generated by the touch sensing unit according to the detecting signal; and transmitting a feedback driving signal to the touch sensing unit according to the touch result, wherein the feedback signal generates an electrical field on at least one of the X-electrodes and at least one of the Y-electrodes so that a feedback tactile sense according to the electrical field can be obtained by a user while touching the touch sensing unit.

The disclosure proposes a projected capacitive touch device having a projected capacitive touch panel having a touch sensing unit formed by a matrix composed of a plurality of X-electrodes and Y-electrodes distributed intersectingly. The device comprises a signal generator. The signal generator mixes a detecting signal and a feedback driving signal to generate a sending signal and then transmits the sending signal to the touch sensing unit, wherein the feedback signal generates an electrical field on at least one of the X-electrodes and at least one of the Y-electrodes of the touch sensing unit so that a feedback tactile sense according to the electrical field can be obtained by a user while touching the touch sensing unit.

The disclosure further proposes a projected capacitive touch device having a projected capacitive touch panel having a touch sensing unit formed by a matrix composed of a plurality of X-electrodes and Y-electrodes distributed intersectingly. The device comprises a signal generator and a signal receiver. The signal generator generates a detecting signal and transmits the detecting signal to the touch sensing unit. The signal receiver is coupled to the touch sensing unit and receives a touch result generated by the touch sensing unit according to the detecting signal. A feedback driving signal generated by the signal generator according to the touch result is transmitted to the touch sensing unit, and the feedback driving signal generates an electrical field on at least one of the X-electrodes and at least one of the Y-electrodes, so that a feedback tactile sense according to the electrical field can be obtained by a user while touching the touch sensing unit.

In order to the make the aforementioned and other objects, features and advantages of the present invention comprehensible, several embodiments accompanied with figures are described in detail below.

DESCRIPTION OF EMBODIMENTS

Figure 1:
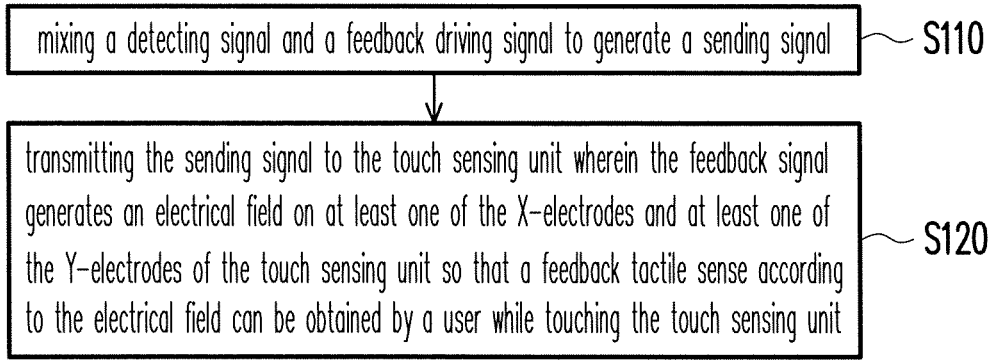
FIG. 1 illustrates a flow chart of a touch control method of a projected capacitive touch panel in an embodiment of the present disclosure.

Referring to FIG. 1, FIG. 1 illustrates a flow chart of a touch control method of a projected capacitive touch panel in an embodiment of the present disclosure. In the embodiment, the projected capacitive touch panel has one or more touch sensing units, each of the touch sensing units is formed by a matrix composed of a plurality of X-electrodes and Y-electrodes distributed intersectingly. The steps of detecting touches for the projected capacitive touch panel include: mixing detecting signals and feedback driving signals to generate sending signals (S110). That is to say, the detecting signals and the feedback driving signals are mixed in advance and then the sending signals are generated accordingly. The detecting signals are used as media for detecting the touched status of the touch sensing units in the projected capacitive touch panel, and the feedback driving signals are those used to generate the feedback tactile senses for a user who touches the touch sensing units. In the present embodiment, the frequency of the detecting signals is higher than that of the feedback driving signals. For example, the first frequency of the detecting signals is between 1 KHz and 500 MHz, and the second frequency of the feedback driving signals is between 10 Hz and 2 KHz. The sending signals are generated by combining the relatively-high-frequency detecting signals and the relatively-low-frequency feedback driving signals.

After accomplishing the step for mixing the detecting signals and the feedback driving signals, the sending signals obtained are transmitted to one or more the touch sensing units of the projected capacitive touch panel (S120), and simultaneously the touched status of the touch sensing units is detected and then feedback tactile senses are obtained by a user who touches the touch sensing units. In the embodiment, electrical field is generated on at least one of the X-electrodes and at least one of the Y-electrodes according to the feedback driving signals, and through the electrical field above mentioned, the feedback tactile sense is obtained by the user who touching the touch sensing units.

It is worthy to be mentioned, in order to avoid the adverse effect of the feedback driving signals on the steps for detecting the touched status of the touch sensing units, the present embodiment further provides filter circuits, disposed at touch sensing ends of the touch sensing units, for receiving the sending signals. The filter circuits filter out the feedback driving signals in the sending signals and receive touch results, generated according to the detecting signals, at the touch sensing ends. The above-mentioned filter circuits are, for example, band pass filter circuits.

It should be noted that the present embodiment could be applied in a self-sensing projected capacitive touch panel and a mutual sensing projected capacitive touch panel, and its applications in any type of projected capacitive touch panels are not limited. Also, as the result of an insulating layer formed over the surface of the projected capacitive touch panel, the electrical fields generated by the feedback driving signals on the touch sensing units do not cause any electric shocks for the user, so that both of the use safety and the effect of the feedback tactile senses for the user could be effectively satisfied.

Figure 2:
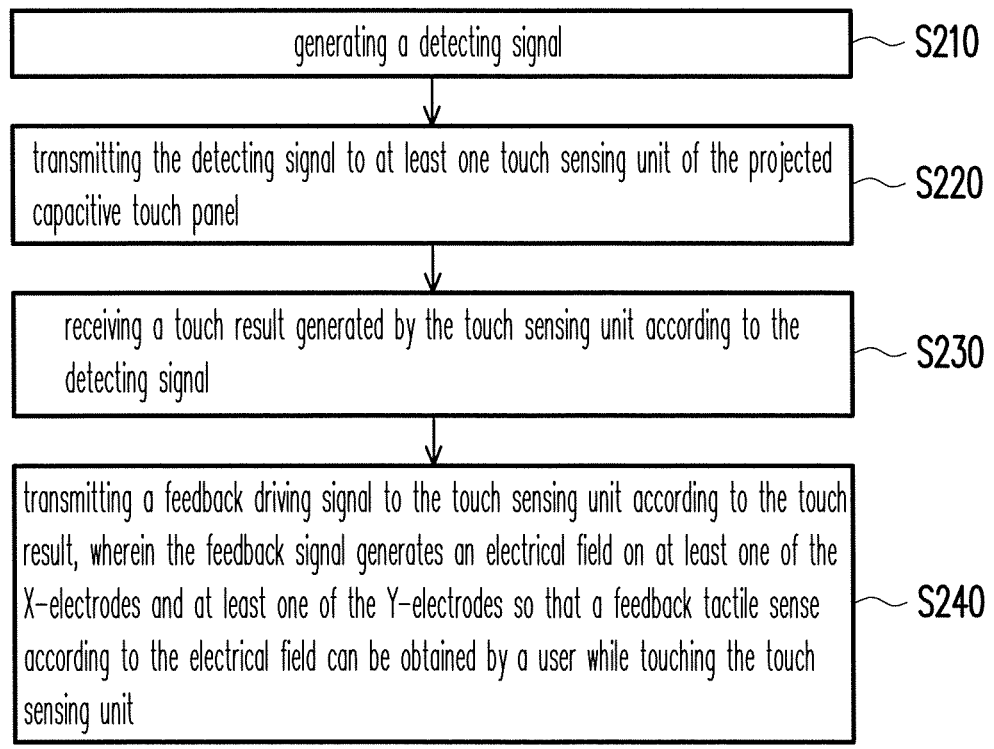
FIG. 2 illustrates a flow chart of a touch control method of the projected capacitive touch panel in another embodiment of the present disclosure.

Referring to FIG. 2, FIG. 2 illustrates a flow chart of a touch control method of the projected capacitive touch panel in another embodiment of the present disclosure. In the present embodiment, the projected capacitive touch panel has one or more touch sensing units, each of the touch sensing units is formed by a matrix composed of a plurality of X-electrodes and Y-electrodes distributed intersectingly. In the present embodiment, the steps of detecting touches for the projected capacitive touch panel include: generating detecting signals (S210) and transmitting the detecting signals to at least one of the touch sensing units in the projected capacitive touch panel (S220), in which the detecting signals are used as indicators for the step of detecting whether the touch sensing units are touched by the user or not. Thereafter, the steps further include: receiving the touch results generated by the touch sensing units according to the detecting signals (S230). Also, feedback driving signals are transmitted to the touch sensing units when the touch results indicate the phenomena that the touch sensing units touched by the user may happen, so that electrical fields are generated on at least one of the X-electrodes and at least one of the Y-electrodes in the touch sensing units according to the feedback driving signals, and then according to the electrical fields, feedback tactile senses can be obtained by the user touching the touch sensing units (S240).

It should be noted, in the present embodiment, the detecting signals and the feedback driving signals for generating feedback tactile senses to the user are transmitted to the X-electrodes and the Y-electrodes of the touch sensing units in different time schedules. Furthermore, in order to reduce the power consumption, the feedback driving signals are transmitted to the touch sensing units only when the statuses that the touch sensing units are touched are confirmed. And, the present embodiment also could be applied in a self-sensing projected capacitive touch panel and a mutual sensing projected capacitive touch panel, and its applications in any types of projected capacitive touch panels are not limited.

Figure 3A:
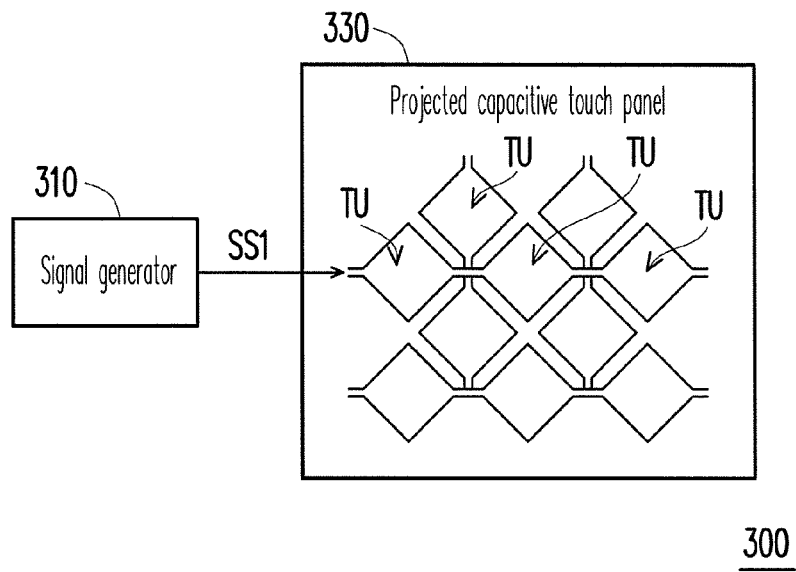
FIG. 3A is a schematic view of a projected capacitive touch device 300 of an embodiment of the present disclosure.

Referring to FIG. 3A, FIG. 3A is a schematic view of a projected capacitive touch device 300 of an embodiment of the present disclosure. The projected capacitive touch device 300 includes a signal generator 310 and a projected capacitive touch panel 330. In the present embodiment, the projected capacitive touch panel 330 has a plurality of touch sensing units TU, each of the touch sensing units is formed by a matrix composed of a plurality of X-electrodes and Y-electrodes distributed intersectingly. The signal generator 310 mixes detecting signals and feedback driving signals to generate sending signals SS1 and then transmits the sending signals SS1 to at least one or more of the touch sensing units TU in the projected capacitive touch panel 330, in which the feedback driving signals generate electrical fields on at least one or more of the touch sensing units TU of the projected capacitive touch panel 330, so that feedback tactile senses according to the electrical fields are obtained by the user while touching the touch sensing units TU. It should be noted, the X-electrodes and the Y-electrodes constituting the touch sensing unit TU can be used to produce the electrical fields on the touch sensing units TU. That is to say, no additional components disposed in the touch sensing units TU are needed for generating the electrical fields.

Figure 3B:
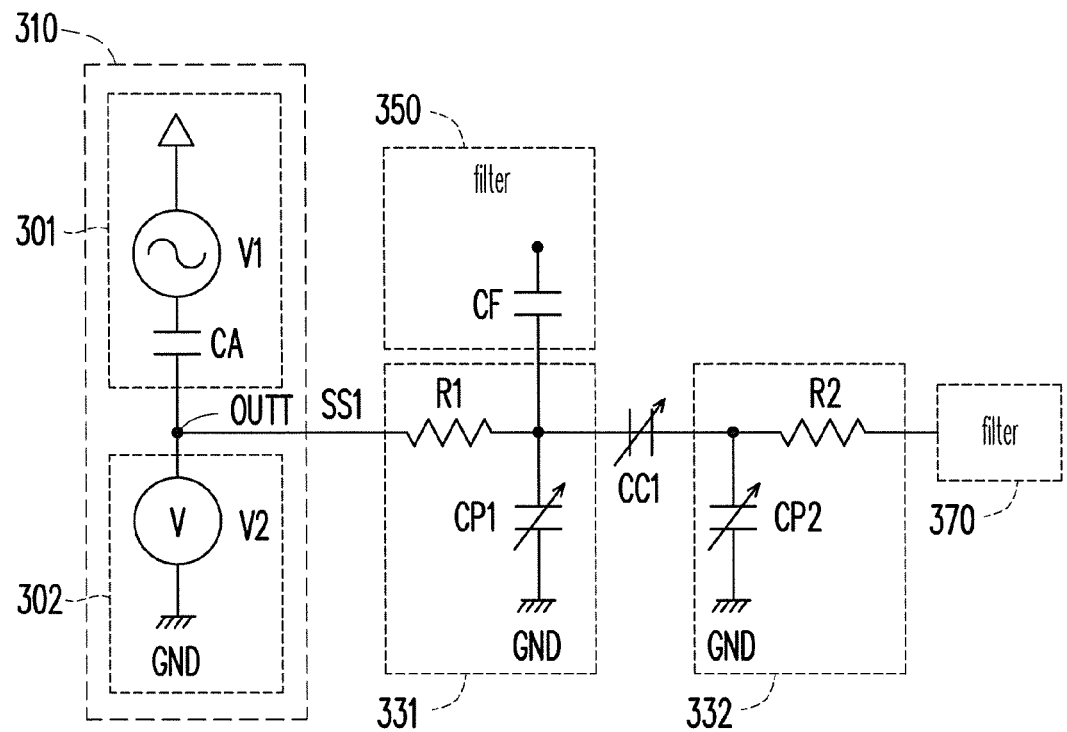
FIG. 3B is an equivalent circuit diagram of the projected capacitive touch device 300 of the embodiment of the present disclosure.

Referring to FIG. 3B for the implementing details of the signal generator 310, FIG. 3B is an equivalent circuit diagram of the projected capacitive touch device 300 of the embodiment of the present disclosure. The signal generator 310 includes a detecting signal generator 301 and a feedback driving signal generator 302. The detecting signal generator 301 is coupled to an output terminal OUTT and generates detecting signals V1. The feedback driving signal generator 302 is coupled to the output terminal OUTT and generates feedback driving signals V2. The detecting signals V1 and the feedback driving signal V2 are summed at the output terminal OUTT and then sending signals SS1 are generated.

In addition, a capacitor CA is serially coupled between the detecting signal generator 301 and the output terminal OUTT. The capacitor CA is used for filtering out the DC portions of the detecting signals V1. Since the first frequency of the detecting signals V1 is higher than that the second frequency of the feedback driving signals V2, it is quite easy to effectively mix the detecting signals V1 and the feedback driving signals V2 at the output terminal OUTT, a common joint for both signals, and then the sending signals SS1 is generated correspondingly.

Equivalent circuits 331 and 332 are the equivalent circuits of two adjacent touch sensing units TU, respectively, in which a resistance R1 and a resistance R2 respectively are the equivalent resistances of the wires coupled to two different touch sensing units TU, and a capacitor CP1 and a capacitor CP2 coupled to the ground end GND are the equivalent capacitors of two different touch sensing units TU, respectively, and a capacitor CC1 is the capacitor located between the two adjacent touch sensing units TU. In FIG. 3B, the projected capacitive touch device 300 further comprises a projected capacitive touch panel 330. The projected capacitive touch device 300 may include a filter 350 if the projected capacitive touch panel 330 is one of self-sensing type. The filter 350 is coupled to the coupling end of the resistance R1 and the capacitor CP1 in the equivalent circuit 331. In the present embodiment, the filter 350 is a capacitor CF used for filtering out the low-frequency feedback driving signals V2 in the sending signals SS1. Of course, the capacitor CF is only one of embodiments of the filter 350, and the present disclosure should not be limited by it and all kinds of circuits capable of filtering signals can be used to fulfill the function of the filter 350. In the other aspect, the projected capacitive touch device 300 comprise a filter 370 if the projected capacitive touch panel 330 is one of mutual sensing type. The filter 370 is coupled to the rear end of the last touch sensing unit (the equivalent circuit 332 for example), and it means that the filter 370 is coupled to the terminal of the resistance R2, but uncoupled to the capacitor CP2. The filter 370 is also used for filtering out the low-frequency feedback driving signal V2 in the sending signal SS1.

Figure 4:
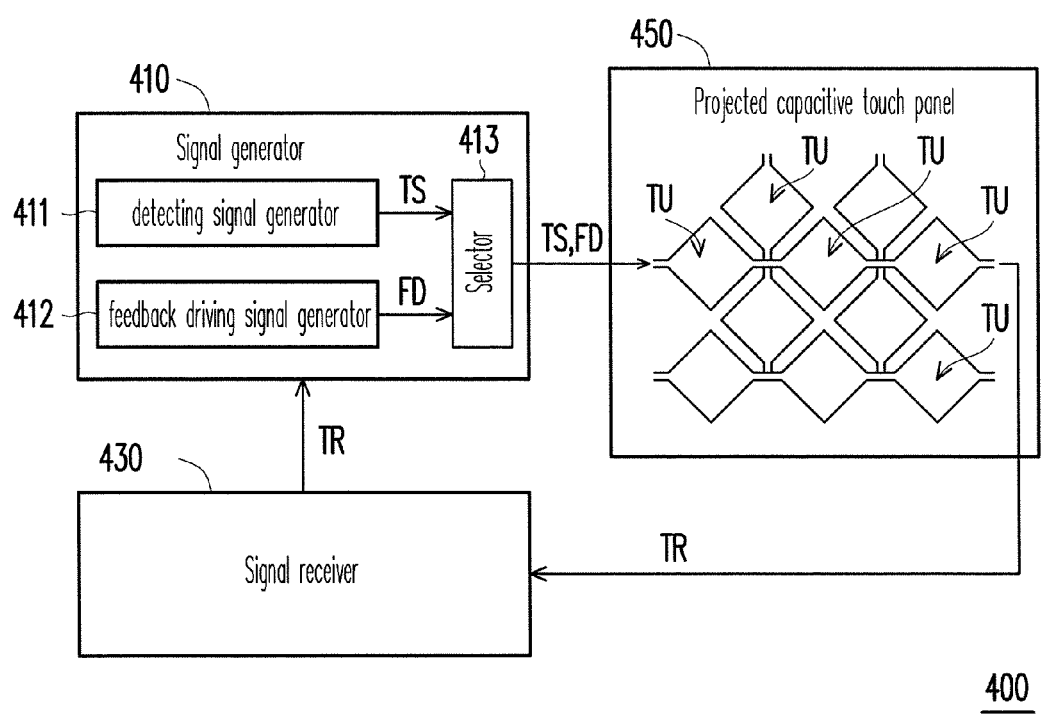
FIG. 4 is a schematic view of a projected capacitive touch device 400 of another embodiment of the present disclosure.

Referring to FIG. 4, FIG. 4 is a schematic view of a projected capacitive touch device 400 of another embodiment of the present disclosure. The projected capacitive touch device 400 comprises a signal generator 410, a signal receiver 430 and a projected capacitive touch panel 450. The signal generator 410 generates detecting signals TS and transmits the detecting signals TS to at least one or more of touch sensing units TU of the projected capacitive touch panel 450, and the signal receiver 430 is coupled to at least one or more of the touch sensing units TU of the projected capacitive touch panel 450. The signal receiver 430 receives touch results TR generated according to the detecting signals TS, in which the signal generator 410 generates feedback driving signals FD according to the touch results TR and then transmits those to at least one or more of the touch sensing units TU in the projected capacitive touch panel 450. The feedback driving signals FD generate electrical fields on at least one X-electrode and at least one Y-electrode of one or more of the touch sensing units TU, so that a feedback tactile sense can be obtained by the user while touching the touch sensing units TU according to the electrical fields. In the embodiment, the signal generator 410 generates the feedback driving signals FD to the touch sensing units TU the touch results TR indicate that the touch sensing units are effectively touched by the user.

The signal generator 410 comprises a detecting signal generator 411, a feedback driving signal generator 412 and a selector 413. The detecting signal generator 411 generates the detecting signals TS and the feedback driving signal generator 412 generates feedback driving signals FD. The selector 413 is coupled to the detecting signal generator 411, the feedback driving signal generator 412 and the touch sensing units TU. The selector 413 transmits the detecting signals TS to the touch sensing units TU during a predetermined time period, and the selector 413 receives the touch results TR and determines whether transmits the feedback driving signals FD to the touch sensing units TU during another predetermined time period according to those touch results TR.

It should be noted that, the time periods during which the selector 413 transmits the detecting signals TS and the feedback driving signals FD respectively do not overlap each other. The following embodiment can be referred as to the transmitting manners of the detecting signals TS and the feedback driving signals FD.

Figure 5A:
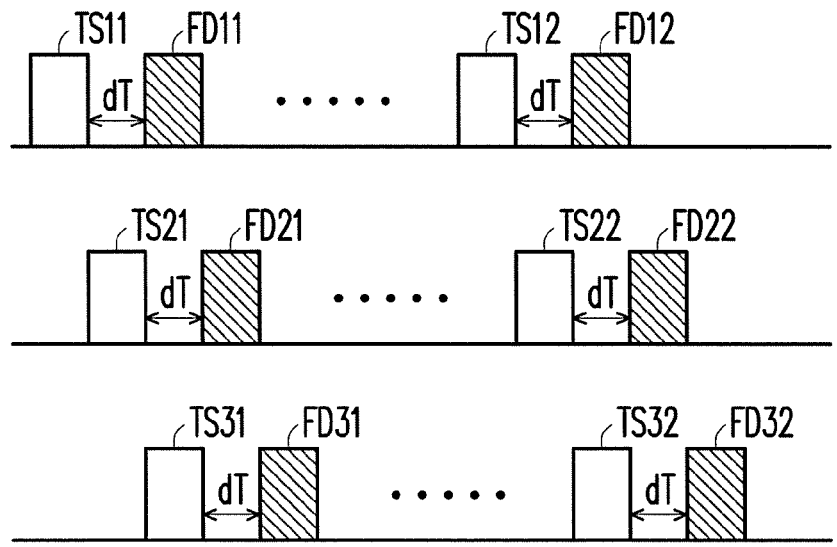
FIGS. 5A and 5B respectively illustrate different transmitting manners of a detecting signal TS and a feedback driving signal FD in the embodiment of the present disclosure.
Figure 5B:
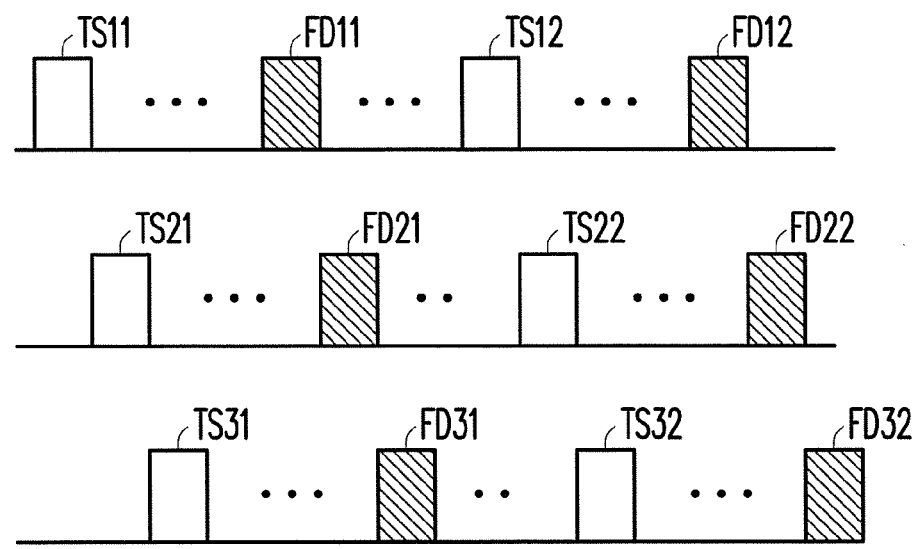

Referring to FIGS. 5A and 5B, FIGS. 5A and 5B respectively illustrate different transmitting manners of a detecting signal TS and a feedback driving signal FD in the embodiment of the present disclosure. In FIG. 5A, the detecting signals TS11~TS32 received by different touching capacitor rows (each row comprises a plurality of serially connected touch sensing units) are transmitted contiguously in sequence. The feedback driving signals FD11-FD32 are transmitted to the different touch capacitors after the corresponding detecting signals TS11~TS32 are transmitted for a time distance later. Simply speaking, the transmission of the feedback driving signals in different touch capacitor rows (for example, the feedback signals FD11 and FD12 shown in FIG. 5A) only relates to the time when the detecting signals TS11 and TS12 of the touch capacitors are transmitted in the same row, but irrelevant to the time when the detecting signals TS11 and TS12 of the touch capacitors are transmitted in the different rows.

Illustrated in FIG. 5B, the detecting signals TS11, TS21 and TS 31 are transmitted contiguously in sequence, and all the corresponding feedback driving signals FD11, FD21 and FD31 in the touch capacitor rows are transmitted only after all the detecting signals TS11, TS21 and TS31 in the touch capacitor rows are transmitted. And after transmitting all the feedback driving signals FD11, FD12 and FD 13 in the touch capacitor rows, the transmissions for all the next detecting signals TS12, TS22 and TS32 in the touch capacitor rows are done. After transmitting all the detecting signals TS12, TS22 and TS32 in the touch capacitor rows, all the corresponding feedback driving signals FD12, FD22 and FD 32 in the touch capacitor rows are transmitted in sequence.

In the summary of the above descriptions, the present disclosure proposes that many functions in the projected capacitive touch panel, including the detection of its touched status and the feedback tactile senses for a user while touching it, can be provided by transmitting the detecting signals and the feedback driving signals to the projected capacitive touch panel. In the present disclosure, the feedback tactile senses are provided by the electrical fields formed on the touch sensing units. Under the protection of the insulating layer, disposed on the surface of the projected capacitive touch panel, the feedback tactile senses can be provided effectively and safely to the user and the texture of the projected capacitive touch panel can also be promoted.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch control method of a projected capacitive touch panel having a touch sensing unit formed by a matrix composed of a plurality of X-electrodes and Y-electrodes distributed intersectingly, the method comprising:
   Providing a detecting signal to a touch sensing end and providing a feedback driving signal to the touch sensing end for summing a detecting signal and a feedback driving signal to generate a sending signal before a touching status detection operation being operated; and
   transmitting the sending signal to the touch sensing unit for operating the touching status detection operation wherein the feedback driving signal in the sending signal generates an electrical field on at least one of the X-electrodes and at least one of the Y-electrodes of the touch sensing unit so that a feedback tactile sense according to the electrical field is obtained by a user while touching the touch sensing unit, wherein the detecting signal is used as media for detecting the touched status of the touch sensing.

2. The touch control method of a projected capacitive touch panel of claim 1, after the step of transmitting the sending signal, further comprises:

providing a filter circuit, disposed at the touch sensing end of the touch sensing unit, to filter out the feedback driving signal in the sending signal and to receive a touch result according to the detecting signal at the touch sensing end.

3. The touch control method of a projected capacitive touch panel of claim 2, wherein the filter circuit is a band pass filter.

4. The touch control method of a projected capacitive touch panel of claim 1, wherein the step of summing a detecting signal and a feedback driving signal further comprises:

providing the detecting signal having a first frequency;

providing the feedback driving signal having a second frequency, wherein the second frequency is lower than the first frequency; and summing the detecting signal and the feedback driving signal to generate the sending signal.

5. The touch control method of a projected capacitive touch panel of claim 4, wherein the first frequency is between 1 KHz and 5 MHz, and the second frequency is between 10 Hz and 2 KHz.

6. A projected capacitive touch device, having a projected capacitive touch panel having a touch sensing unit formed by a matrix composed of a plurality of X-electrodes and Y-electrodes distributed intersectingly, the device comprises:

a signal generator summing a detecting signal and a feedback driving signal to generate a sending signal by providing the detecting signal to a touch sensing end and providing the feedback driving signal to the touch sensing end before a touching status detection operation being operated, and transmitting the sending signal to the touch sensing unit for operating the touching status detection operation, wherein the feedback driving signal in the sending signal generates an electrical field on at least one of the X-electrodes and at least one of the Y-electrodes of the touch sensing unit so that a feedback tactile sense according to the electrical field is obtained by a user while touching the touch sensing unit, wherein the detecting signal is used as media for detecting the touched status of the touch sensing unit.

7. The projected capacitive touch device of claim 6, further comprising:

a filter circuit coupled to the touch sensing unit wherein the filter circuit filters out the feedback driving signal in the sending signal and the touch sensing unit receives a touch result according to the detecting signal at the touch sensing end thereof.

8. The projected capacitive touch device of claim 7, wherein the filter circuit is a band pass filter.

9. The projected capacitive touch device of claim 7, wherein the filter circuit comprises:

a capacitor having one end coupled to the touch sensing end and having another end to generate the touch result.

10. The projected capacitive touch device of claim 6, wherein the detecting signal has a first frequency and the feedback driving signal has a second frequency, wherein the second frequency is lower than the first frequency.

11. The projected capacitive touch device of claim 6, wherein the signal generator comprises:

a detecting signal generator coupled to an output terminal and generating the detecting signal; and a feedback driving signal generator coupled to the output terminal and generating the feedback driving signal, wherein the sending signal is generated at the output terminal.

12. The projected capacitive touch device of claim 11, wherein the signal generator further comprises:

a capacitor for filtering out a DC portion of the detecting signal, the capacitor is serially coupled between the detecting signal generator and the output terminal.

13. The projected capacitive touch device of claim 6, wherein an insulating layer is formed on the surface of the projected capacitive touch panel.

* * * * *